May 16, 1939.  F. FOCHER, JR  2,158,227

POWER TRANSMISSION

Filed Jan. 6, 1937  3 Sheets-Sheet 1

INVENTOR.
Frank Focher Jr

May 16, 1939.　　　　F. FOCHER, JR　　　　2,158,227

POWER TRANSMISSION

Filed Jan. 6, 1937　　　　3 Sheets-Sheet 3

INVENTOR.
Fred Focher Jr.

Patented May 16, 1939

2,158,227

UNITED STATES PATENT OFFICE 2,158,227

POWER TRANSMISSION

Frank Focher, Jr., Worden, Mont.

Application January 6, 1937, Serial No. 119,195

8 Claims. (Cl. 74—259)

This invention relates to power transmission devices and in particular to that type of device adapted to automatically compensate for load differential as between a driving member and a driven member.

In its broad aspect the invention has a multitude of applications and in its present form reference will be made to its adaption as a power transmitter in motor vehicles but it will be clearly understood that such reference is not intended to impose limitation, range or scope since its use is applicable to any circumstance necessitating compound power gearing and a load differential.

Commonly known in the art there are three main types of power transmission devices, that is to say, the friction type, the planetary type and the selective type. In these several types of devices there are many universal objections, one principally being the breaking of the inertia at the starting point or movement where there is a load differential always subject to variation in accordance with circumstance and operative conditions.

Generally speaking, where a motor vehicle is concerned, some of the differentials where the load is inconstant include gradients, initial movement of a load, downward slopes, etc., etc., and in each instance there is altered ratio in load differential consequenting alteration in driving power to compensate for the progressive increase or decrease in load resistance.

As is well known, the selective type of transmission is predominantly employed in motor vehicles and includes what is commonly known as first, second, third and fourth speeds with a series of manually shiftable gears provided to compound or otherwise compensate the driving force in accordance with the changing conditions of load resistance.

With this and similar types of mechanism many disadvantages, inconveniences and annoyances obtain due in a large measure to the necessity of gear changing to compensate for almost constantly changing load conditions, clumsy mechanism, loss of power and motion and the inefficient mechanism and method of measuring the proper relative balance between the driving and driven unit to meet frequently altered load conditions.

With the present invention the foregoing and other objections and disadvantages are overcome in a novel, simple and practical manner, therefore, one of the objects contemplated in the present invention is the provision of a device of this nature which will transmit power from one unit to another and automatically compensate for the load changing conditions as between such respective units.

Another object of the invention is to provide a device of this character which gently breaks the inertia irrespective of constantly changing load conditions.

A further object of the present invention is to provide a device of this character which instantly establishes a normal, balanced equilibrium as between a driving and a driven unit in accordance with the load variation.

A still further object of the present invention is to provide a device of this character which persistently weighs allowable resistance and progressively compensates for the load differential from initial movement onward and vice versa.

Still a further object of the present invention is to provide a device of this character which when associated with motor vehicles, simplifies the mode of operation and efficiently improves the vehicle mechanism and the propelling properties thereof.

Yet a further object of the invention is to provide a device of this character which conserves power, reduces fuel consumption and more efficiently performs the functions required of it.

Having regard to the foregoing and other objects and advantages which will become apparent as the description proceeds, the invention consists essentially in the novel combination and arrangement of parts hereinafter described in detail and illustrated in the accompanying drawings in which.

Figure 4:
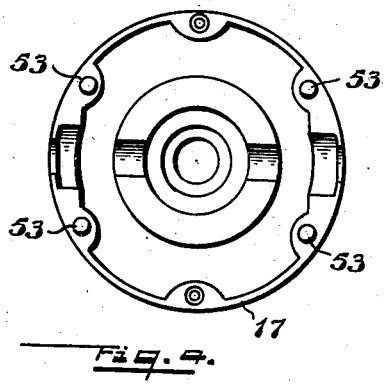
Fig. 4 is an end view of the center section of the differential gear supporting case and torque responsive member.
Figure 3:
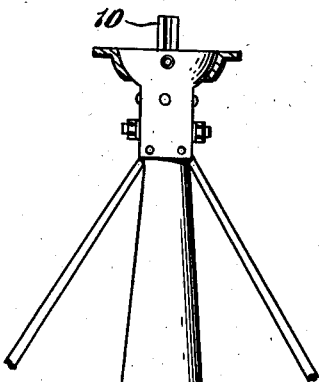
Fig. 3 is a view of an embodiment of the gear arrangement included in the device which is shown in detached form.
Figure 3:
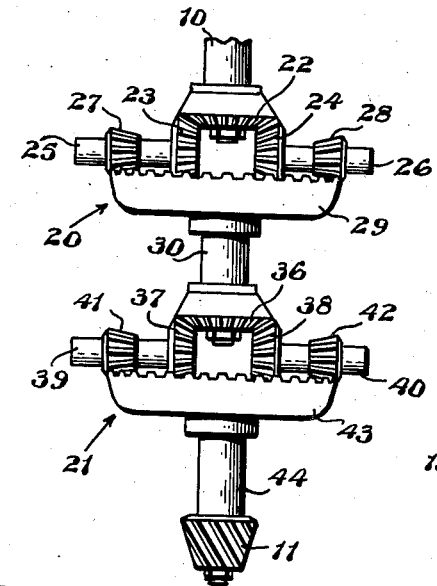
Figure 1:
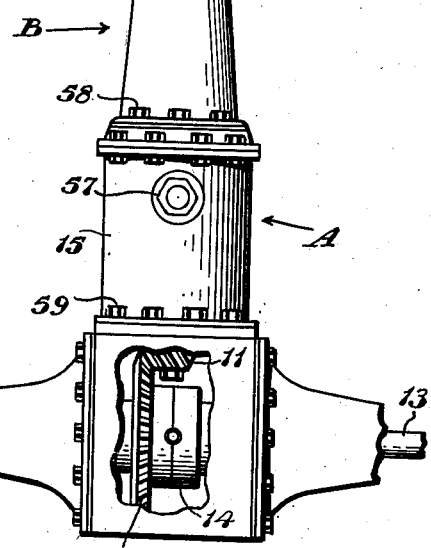
Fig. 1 is a view of the drive shaft of an ordinary motor vehicle with axles and associated parts employed for illustrative purposes showing an embodiment of my invention incorporated therein.
Figure 5:
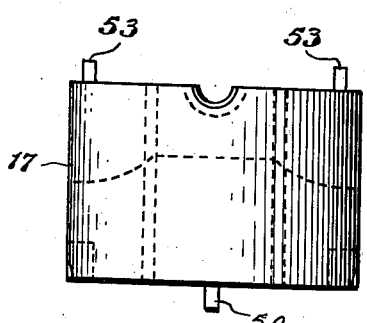
Fig. 5 is a side view of Fig. 4.

Referring now to the drawings of the present invention wherein an embodiment of the device is illustrated and wherein like letters and numerals of reference designate corresponding parts in the several views, the letter A indicates the invention as presently disclosed in association with the drive means B of an ordinary motor vehicle, such drive means including the drive shaft 10, pinion and crown gears 11 and 12 respectively and axle shafts 13.

As is well known, a drive shaft is operable through a prime mover which is sufficiently well known in the art to not require illustration. The relative position of the power transmitting device with respect to the operative mechanism is a matter of convenient adaption and in practice I have found its operation efficient when disposed between the drive shaft 10 and the rear end differential 14.

Figure 2:
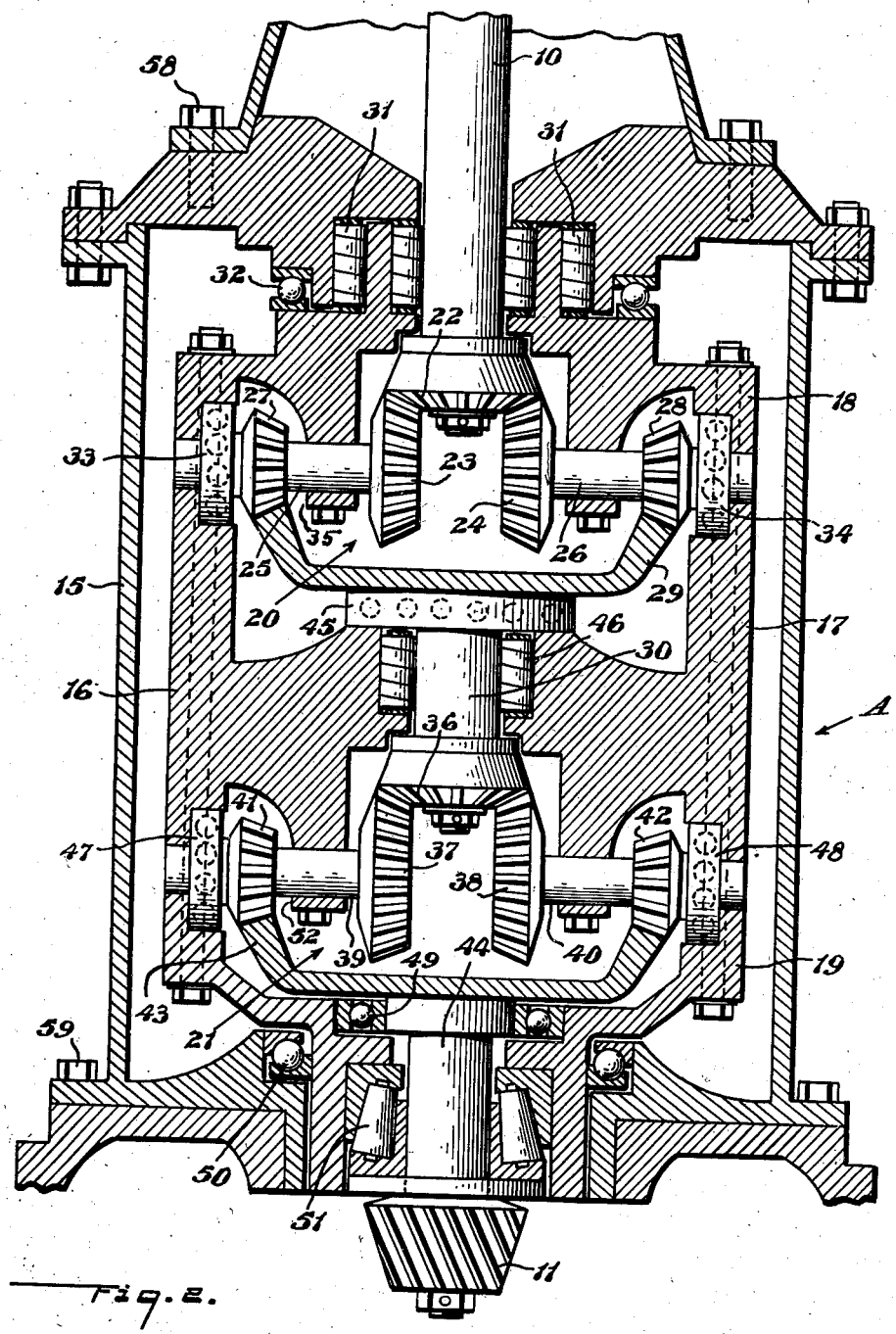
Fig. 2 is an enlarged longitudinal section taken through the center of an embodiment of the present invention.
Figure 10:
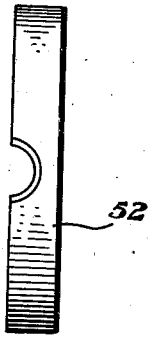
Fig. 10 is a side view of Fig. 7.
Figure 9:
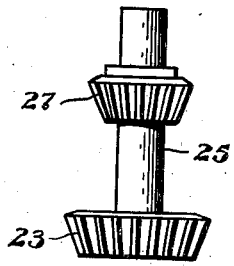
Fig. 9 is a view of one of the twin pilot gear units.
Figure 8:
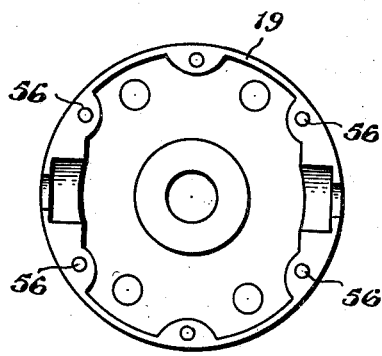
Fig. 8 is a view of the rear end section of the gear case bearing cap.
Figure 7:
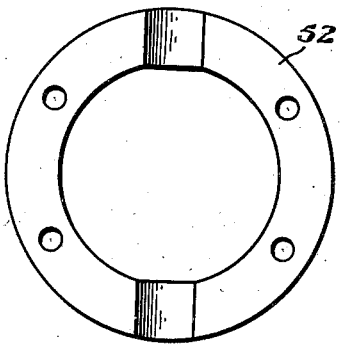
Fig. 7 is an end view of the inside bearing cap for the mounting of the twin pilot gear members.
Figure 6:
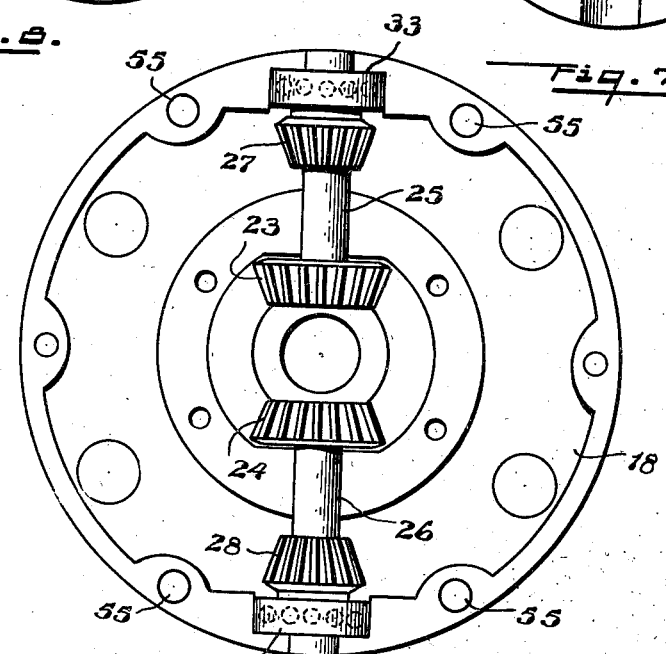
Fig. 6 is an end view of the front end section of the gear case bearing cap in enlarged form showing the twin pilot gears in operative position.

Coming now to the details in structure of the invention, and referring particularly to the enlarged assembly shown in Fig. 2, this includes a stationary housing or casing 15 within which the transmission unit 16 is operatively mounted. The housing 15 it is to be observed also acts as a reservoir for the supply of lubrication to the member 16.

In form, the unit 16 may assume any suitable proportion, contour, shape or size and includes the differential gear supporting case and torque responsive member 17, front end bearing cap 18 and rear end bearing cap 19.

Within the member 17 and having connection therewith are arranged primary and secondary differential gear units 20 and 21 respectively, the former having operative connection with the drive member 10 and the latter with the driven member 11.

As previously mentioned the unit 16 is designed to transmit power from the drive member 10 to the driven member 11 and in accordance with the present invention automatically compensates for load changing conditions or degree of resistance offered by the member 11 such compensation being effected through the member 17, differential gear units 20 and 21 and the unit 16 as a whole.

The units 20 and 21 may be referred to in terms of compound gearing which comes into operation between the initial or primary load movement and high speed or a one to one ratio or vice versa and has a range for all critical load changes between what is commonly known as low and high speeds. In progressive decrease in load or resistance from initial movement, there is a corresponding decrease in gear compounding and the driving force of the driving member is conducted through the primary and secondary units 20 and 21 which in accordance with the load resistance may be independent of or in combination with the member 17 or the unit 16 as a whole may function as a single driving unit, the induction or activity of the respective gear units 20 and 21 together with or independent of the member 17 being governed by the resistance of the load as will be later referred to.

During operation the gears of the respective units 20 and 21 set up an opposed torque and such opposed torque influences the cooperative participation of the member 17 in the sequence of gear compounding which will again be referred to.

More in detail, the differential gear unit 20 comprises gear 22 mounted upon drive shaft 10 and meshes with bevel gears 23 and 24. These bevel gears in turn are mounted upon stub shafts 25 and 26 which are provided with further gears 27 and 28 of the bevel type thus the gears 23, 27 and 24, 28 form what may be termed twin pilot gears. The crown gear 29 is mounted upon shaft 30 and is in toothed engagement with the gears 27 and 28 which completes the differential gear phase of the unit 20. Suitable bearings 31 and 32 are provided for shaft 10 and unit 16 while bearings 33 and 34 and bearing cap 35 operatively support the twin gear shafts 25 and 26.

Spaced in relation to the primary unit 20 and operatively connected therewith is the secondary differential gear unit 21. This latter unit includes gear 36 connected to the shaft 30. Meshing with the gear 36 are bevel gears 37 and 38. These last mentioned gears are mounted upon shafts 39 and 40 and are provided with companion gears 41 and 42. The gears 41 and 42 mesh with crown gear 43 which is mounted upon shaft 44, the shaft 44 also carrying the pinion 11 previously referred to.

Suitable bearings 45, 46, 47, 48, 49, 50 and 51 provide antifriction support for the respective shafts and operative mechanism while a bearing cap 52 secured in position by bolts or the like is employed for the shafts 39 and 40.

Dowel pins or like means 53 and 54 may be carried in the skirt of the center section of the unit 16 and these pins are adapted to engage the orifices 55 and 56 formed in the front and rear bearing cap members 18 and 19 respectively. The bores, structure and arrangement of the various parts is such that the moving and operative elements will the more satisfactorily perform the functions required of them.

A filler plug or the like 57 is provided for easy access to replenish a lubricant supply to the unit 16 while as indicated at 58 and 59, the transmission may be secured between the drive shaft housing and the rear axle housing, preferably close to the latter.

*Operation*

Particular reference is now made to operation of the device wherein the functions of the relative units are described with more detail. Assume first that operative power is applied to the drive member 10. Rotative operation of this member conducts driving power through the medium of the transmitting unit 16 to the driven member 11. Upon applied power reaching the member 11 a resistance or load is met and such load is normally greater than a direct driving power or in other words greater than a one to one ratio therefore a balanced ratio of driving power must intervene if the load is to be moved or the resistance overcome and as a consequence the multiple gearing of the invention immediately and automatically come into operation to compensate for the ratio difference, thus the power drive from the member 10 to the member 11 is through the gearing 22, 23, 24, 27, 28 and 29, shaft 30, gearing 36, 37, 38, 41, 42 and 43 and shaft 44.

With the aforementioned gears being brought into operation the inertia of the load is gently broken and the gearing and shafts above mentioned are thrown into operation while the case or torque responsive member 17 remains stationary.

The inertia being broken the load or resistance is decreased and consequently with decreased resistance less power is required to drive the member 11 therefore the unit 16 seeks a new range or ratio balance to compensate for the decrease in resistance. This new range or ratio balance essentially reduces gear compounding and as a result there is a gradual reduction in the operation in the differential gears of the secondary unit 21.

Compensation for the altered load resistance, which may broadly be referred to as the first step from low to a higher ratio, is observed in the reduced operation of the gearing members embodied in the secondary unit 21 and the commencement of activity of the member 17 which influenced by the opposed torques set up by the primary and secondary units 20 and 21, gradually becomes operative. Progressively then from this point the gears 41 and 42, to an extent, mingle riding properties with driving properties of the gear 43 and with the differential of the opposed torques of the units 20 and 21, the shafts 39 and 40 become cooperative transmitters which transpose the compensating differential in power then required through such shafts to the torque responsive member 17. Thus at this stage—it being understood that we are now expressing the drive in terms of from low to a higher speed drive—the member 17 is an active driving power cooperating with the gear 43.

A further decrease in the load or resistance at the driven member increases the riding properties of the gears 41 and 42 and decreases their driving properties and with a further altered differential in the torque as between the units 20 and 21 there is an increase in the rotative speed of the member 17 until at a further stage the secondary unit 21 is substantially silent, the compensating differential, in accordance with the resistance values, having been transposed and taken up through the medium of the member 17.

With a continued and further reduction in load resistance, the driving gears 27 and 28 then in turn comingle riding properties with the driving properties of the gear 29 and their operative differential is compensated by transmitting the driving force deducted from the driving gears 27 and 28 to the shafts 25 and 26, thus these latter shafts become cooperative transmitters and carry the power differential then required to the member 17 which as a consequence further increases its rotative speed. As a result the riding properties of the gears 27 and 28 are increased and their driving properties are decreased until eventually the entire driving force, in accordance with the load, is translated from the compounding stage to the direct drive stage, the units 20 and 21 having completely dissipated the power compounding properties, the unit 16 as a whole acts as a unitary drive with a one to one ratio between the driving member 10 and the driven member 11.

Having described the operation from the point of breaking the inertia to the point of a one to one drive ratio, it will be well understood that with an increased resistance or load differential, the device will immediately and automatically revert to that stage where there is sufficient gear compounding to establish a balance between the driving member and the driven member to compensate for the degree of resistance established by the load increase, the load resistance determining the ratio of gear compounding brought into active operation.

In the foregoing I have set forth operation from the breaking of the inertia to the one to one drive ratio of the respective driving and driven members and in setting forth the operation and compensating changes and actions it has been deemed sufficient to define the more critical stages of differentiation since comprehending the actions and operations defined, intermediary sequences become quite clear and the operation of the device as a whole in various stages is readily followed and easily understood.

From the foregoing it will be seen that I have developed a novel, simple and practical power transmitting device wherein a constant equilibrium is maintained between the driving force and the load or resistance which instantly compensates for the load differential and constantly maintains a balance between the driving member and the driven member irrespective of the load differential.

Many changes may be made in the above and many apparently widely different embodiments constructed without departing from the spirit or scope thereof. It is intended therefore that all matter herein contained shall be interpreted as illustrative and not in a limiting sense.

What I claim as my invention is:

1. Power transmission comprising a driving member and a driven member, a rotatable member carried by the said driving and driven members, gear means interposed between the driving and driven members adapted to vary the speed ratio therebetween comprising a primary and a secondary gear unit including crown gears and twin pilot gears, a drive gear for the drive shaft adapted to drive the primary gear unit, a secondary gear operable by the primary unit adapted to drive the secondary gear unit, said gear units being carried by the rotatable member and the driving force of the said rotatable member being adapted to supersede and be supplemented by the driving force of the primary and secondary gear units in accordance with predetermined load differential.

2. Power transmission comprising a driving member and a driven member, an intermediate drive member interposed between the driving and driven members, drive gears mounted on the drive member and the intermediate drive member, crown gears mounted on the intermediate drive member and the driven member, twin pilot gears operatively connecting the said drive gears and the crown gears adapted to vary the speed ratio between the driving and driven members, a rotatable member carrying the said twin pilot gears, the driving force of the said rotatable member functioning to supersede the driving force of the said gears in accordance with predetermined load differential.

3. Power transmission comprising a driving member, an intermediate drive member, and a driven member, a series of gears interposed between the said driving, intermediate and driven members adapted to vary the speed ratio between the driving and driven members, a rotatable member housing the series of gears, shaft means carried by the rotatable member adapted to support a majority of the gears in angular axial relation to the driving and driven members, the series of gears being capable of operation independent of the rotatable member and the driving force of the rotatable member functioning to supersede and be supplemented by the driving force of the gears in accordance with predetermined load differential.

4. Power transmission comprising a driving member and a driven member, a rotatable member carried by the driving and driven members, primary and secondary gear units mounted in the rotatable member operatively connected to and adapted to vary the speed ratio between the driving and driven members, a majority of the gears of the said gear units being operable in angular axial relation to the driving and driven members, the said primary gear unit being operable as a driving force independent of the secondary gear unit and the driving force of the said rotatable member functioning to supersede and be supplemented by the driving force of the gear units step by step in accordance with predetermined load differential.

5. Power transmission comprising a driving member and a driven member, primary and secondary gear units interposed between and operatively connected to the driving and driven members adapted to vary the speed ratio between the said members, a rotatable member housing the primary and secondary gear units, shafts carried by the rotatable member adapted to support a majority of the primary and secondary gear units in angular axial relation to the driving and driven members, the said primary gear unit being capable of operation with the rotatable member to vary the driving force of the secondary gear unit, and the driving force of the said rotatable member functioning to supersede and be supplemented by the driving force of the gear units step by step in accordance with predetermined load differential.

6. In a power transmission, a drive shaft and a driven shaft, a rotatable member carried by the said drive and driven shafts, a primary gear unit and a secondary gear unit carried by the said rotatable member operatively connected with one another and with the drive and driven shafts and adapted to vary the speed ratio between the said drive and driven shafts, the said primary and secondary gear units being operable as a driving force independent of the rotatable member and operable as a driving force in combination with the rotatable member.

7. In a power transmission, a drive shaft and a driven shaft, a rotatable member carried by the said drive and driven shafts, a primary gear unit and a secondary gear unit arranged in a common plane, the said gear units being operatively connected with one another, with the drive and driven shafts and with the rotatable member, the said gear units being adapted to vary the speed ratio between the drive and driven shafts and be operable as a driving force independent of one another and independent of the driving force of the rotatable member.

8. In a power transmission, a drive shaft and a driven shaft, a rotatable member carried by the said drive and driven shafts and rotatable independent of the said shafts, a primary gear unit and a secondary gear unit operatively connected with one another and with the drive and driven shafts adapted to vary the speed ratio between the said drive and driven shafts, the said gear units being operable as a driving force independent of the said rotatable member and operable as a driving force individually in combination with the said rotatable member.

FRANK FOCHER, Jr.